United States Patent
Akiyama et al.

(10) Patent No.: US 6,464,374 B2
(45) Date of Patent: Oct. 15, 2002

(54) VEHICULAR LAMP UNIT AND METHOD FOR MANUFACTURING SAME

(75) Inventors: Kazuo Akiyama, Shizuoka (JP); Fujihiko Sugiyama, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/794,206

(22) Filed: Feb. 28, 2001

(65) Prior Publication Data

US 2001/0028567 A1 Oct. 11, 2001

(30) Foreign Application Priority Data

Feb. 29, 2000 (JP) .......................................... 2000-52900

(51) Int. Cl.[7] .............................................. F21V 31/00
(52) U.S. Cl. ........................ 362/267; 362/310; 362/520
(58) Field of Search ................................ 362/546, 267, 362/310, 311, 520

(56) References Cited

U.S. PATENT DOCUMENTS

| | | | |
|---|---|---|---|
| 4,831,502 A | * 5/1989 | Fujino et al. | ................. 362/61 |
| 5,331,521 A | 7/1994 | Ravier et al. | |
| 5,398,172 A | 3/1995 | Kojima et al. | |
| 5,560,706 A | 10/1996 | Yamazaki et al. | |
| 5,605,392 A | 2/1997 | Daumueller et al. | |
| 5,618,098 A | * 4/1997 | Naganawa et al. | ............ 362/61 |
| 5,673,992 A | 10/1997 | Schmitt | |
| 5,735,591 A | * 4/1998 | Ruckwied | ................... 362/61 |
| 5,947,591 A | * 9/1999 | Katsumata et al. | ......... 362/267 |
| 6,017,141 A | * 1/2000 | Sugiyama et al. | .......... 362/520 |
| 6,033,095 A | * 3/2000 | Ognian | ....................... 362/375 |
| 6,033,505 A | 3/2000 | Sugiyama et al. | ......... 156/73.5 |
| 6,089,731 A | 7/2000 | Sugiyama et al. | .......... 362/310 |
| 6,217,202 B1 | * 4/2001 | Kageyama et al. | ......... 362/516 |
| 6,318,883 B1 | 11/2001 | Sugiyama et al. | |

* cited by examiner

*Primary Examiner*—Alan Cariaso
*Assistant Examiner*—Sharon Payne
(74) *Attorney, Agent, or Firm*—Sughrue Mion, PLLC

(57) ABSTRACT

A vehicular lamp in which bonding failure between a front lens and a lamp body is prevented while enhancing the bonding strength and improving the quality of the outer appearance around the bonded surface therebetween. An end surface of a seal leg of a front lens and a receiving surface of a lamp body are bonded through laser beam welding so as to improve the outer appearance quality of the area around the bonded surfaces. The end surface is formed on an end portion of the seal leg that is bent and extended outward at a predetermined angle with respect to the bonding direction. The laser beam is irradiated onto the receiving surface through the end portion from a direction substantially orthogonal to the end surface. The resultant permeation distance of the laser beam is made short, resulting in a sufficient amount of irradiation energy. When pressure is applied to the base end portion of the seal leg by pressing on the front lens, the end surface and the receiving surface are brought into abutment in the width direction with uniform pressure.

22 Claims, 8 Drawing Sheets

VEHICULAR LAMP UNIT AND METHOD FOR MANUFACTURING SAME

BACKGROUND OF THE INVENTION

The present invention relates to a vehicular lamp unit, and a manufacturing method therefor, in which a front lens and a lamp body are directly bonded together.

Conventionally, two types of methods for bonding a front lens and a lamp body of a vehicular lamp unit have been well known, that is, indirect bonding via a seal member (for example, the hot melt sealing method), and direct bonding by bringing the two members into direct abutment (for example, heating plate welding, vibration welding, ultrasonic bonding, or the like).

As a direct bonding method, laser beam welding has been well known in other technical fields. Such a method is applicable to the bonding of a front lens and a lamp body. One such a process will be described with reference to FIG. 8 (see also commonly assigned co-pending U.S. patent application Ser. No. 09/548,361).

Referring to FIG. 8, a seal leg 2a extending in the outward direction along the outer periphery of a front lens 2 is formed. A receiving surface 4a is formed along the opening portion of the front end of a lamp body 4. The lamp body 4 is placed on a receiving jig 102. The front lens 2 is set onto the lamp body 4 in such a manner that an end surface 2b of the seal leg 2a is brought into abutment against the receiving surface 4a. The front lens 2 is further covered with a transparent pressure plate 104 through which the front lens 2 is pressed to the lamp body 4. In the above state, a laser beam L is irradiated onto the receiving surface 4a from a position upward of the front lens 2 through the transparent pressure plate 104 and the seal leg 2a. As a result, the receiving surface 4a. is heated and melted by the irradiation energy of the laser beam L so as to fuse with the end surface 2b of the seal leg 2a that has been melted by the heat. The front lens 2 and the lamp body 4 thus are bonded together by scanning the laser beam L along the seal leg 2a over the entire length of the front lens 2.

Employing the above-described laser beam welding method allows bonding of the front lens 2 and the lamp body 4 without generating burrs on the respective bonded surfaces, resulting in improved quality of the outer appearance around the peripheral portion of the bonded surfaces. However, this welding method may result in certain disadvantages.

Namely, in the laser beam welding method, the laser beam L is irradiated by permeating through the transparent pressure plate 104 and the seal leg 2a, which reduces the irradiation energy of the laser beam L by an amount proportional to the permeation distance (the distance obtained by adding the entire length Do of the seal leg 2a to the thickness of the transparent pressure plate 104). Moreover, the front lens 2 has to be pressed at a point displaced from the position just above the seal leg 2a because the optical path of the laser beam L must be avoided. Accordingly, the end surface 2b of the seal leg 2a and the receiving surface 4a cannot be brought into abutment with a uniform pressure in the width direction. As a result, the required bonding strength cannot be ensured over the entire width of the bonded surface.

SUMMARY OF THE INVENTION

The invention has been made in view of the foregoing circumstances. It is therefore an object of the invention to provide a vehicular lamp unit and a manufacturing method therefor in which the front lens and the lamp body are directly bonded together so as to improve the outer appearance quality as well as to enhance the strength of bonding between the front lens and the lamp body.

The aforementioned object is realized by the invention by employing laser beam welding as the method for bonding the front lens and the lamp body together and by suitably establishing the configuration of the peripheral portion of the bonded surfaces.

The vehicular lamp unit of the invention having a front lens and a lamp body directly bonded together is characterized in that a seal leg extending in an outward direction is formed on the outer periphery of the front lens, a receiving surface that is brought into abutment against an end surface of the seal leg is formed on the lamp body, the end surface of the seal leg and the receiving surface are directly bonded together through laser beam welding, and a laser beam receiving surface, which protrudes to direct a laser beam entering from a direction at an angle with respect to the reference axis of the lamp to the end surface, is formed on an outer side surface of the seal leg.

The term "laser beam welding" indicates a bonding method wherein a laser beam transmitting member that allows permeation of the laser beam is brought into abutment against a laser beam non-transmitting member that does not allow permeation of the laser beam, both members are pressed in the outward direction, and a laser beam is irradiated onto the abutment surfaces of the two members through the laser beam transmission member so as to heat the laser beam non-transmission member. As a result, both members are fused together. The laser beam used for the laser beam welding is not particularly limited, and, for example, a semiconductor laser, a YAG laser or the like may be employed.

The material for forming the lamp body is not particularly limited so long as it does not allow transmission of the laser beam and is heated and melted by the laser beam irradiation. For efficient laser beam welding, it is preferable that the lamp body is formed of a black-colored material to which an auxiliary material such as carbon black has been added so as to enhance the laser beam absorbing capability of the lamp body.

Also, the material for the front lens is not particularly limited so long as it allows transmission of visible light and the laser beam and it can be fused and fixed to a lamp body that has been melted.

The configuration of the laser beam receiving surface also is not particularly limited so long as it is capable of leading the laser beam irradiated from a direction at an angle with respect to the bonded surface to the end surface of the seal leg.

In the aforementioned construction, the front lens and the lamp body of the vehicular lamp unit of the invention are directly bonded together by laser beam welding such that the end surface of the seal leg formed on the front lens is bonded to the receiving surface formed on the lamp body. This allows bonding without generating burrs on the respective bonded surfaces, thus improving the appearance quality around the bonded surfaces.

The vehicular lamp unit of the invention has a projecting laser beam receiving surface for directing the laser beam irradiated onto the outer surface of the seal leg that extends in the outward direction from a direction at an angle with respect to the bonded surface to the end surface of the seal leg. This provides the advantageous effects described below.

During the bonding operation, the permeation distance of the laser beam corresponds to the distance from the laser beam receiving surface of the seal leg to the end surface. This distance can be made much shorter than in the case where bonding is performed by laser beam permeation through a transparent pressure plate and the seal leg. As a result, the laser beam bonding can be performed with sufficient irradiation energy.

The laser beam is irradiated from a direction at an angle with respect to the bonded surface. This makes it possible to press the front lens by applying pressure to the base end portion of the seal leg. The end surface of the seal leg portion and the receiving surface can be abutted with one another under uniform pressure relative to the width direction thereof. The required bonding strength thus can be easily achieved across the entire width of the bonded surface.

In the vehicular lamp unit having the front lens and the lamp body directly bonded together according to the present invention, the bonding strength between the front lens and the lamp body is sufficiently enhanced while improving the outer appearance quality of the portion around the bonded surfaces.

With the vehicular lamp unit constructed such that the end portion of the seal leg is bent toward the outer periphery at a predetermined angle with respect to the bonded surface, the advantageous effects described below can be obtained.

Even in a case where the end surface of the seal leg or the receiving surface has a wave-like irregularity owing to insufficient smoothness such that gaps are created in areas therebetween, the pressure acting on the members to be bonded causes slippage between them because the bonded surface is inclined. This slippage serves to seal the gaps created in areas between the two members so as to enable abutment thereof over the entire length of the bonded surface. Accordingly, bonding failure is prevented. The bending angle of the end portion is not limited to a particular value, whether large or small, so long as it is less than 90°.

In this case, the receiving surface of the lamp body may be provided with an outer rib that projects in the outward direction along the outer side surface of the end portion of the seal leg of the front lens such that the outer rib is brought into abutment against the seal leg. This makes it possible to prevent generation of unnecessary slippage between the end surface of the seal leg and the receiving surface owing to the pressure acting on the bonded surface during the bonding operation.

In the above case, the receiving surface of the lamp body may further be provided with an inner rib that projects in the outward direction along the inner side surface of the end portion of the seal leg of the front lens. Even if the direction of a laser beam irradiated from a direction substantially orthogonal to the end surface of the seal leg is slightly displaced, the laser beam can still be irradiated onto the outer side surface of the inner rib so as to properly heat and melt the inner rib. The outer side surface of the inner rib and the inner side surface of the seal leg can be bonded to define a second bonded surface. This makes it possible to further enhance the bonding strength between the front lens and the lamp body.

DESCRIPTION OF THE PREFERRED EMBODIMENTS

Preferred embodiments of the present invention will be described referring to the accompanying drawings.

A first embodiment of the invention will be hereinafter described.

Figure 1:
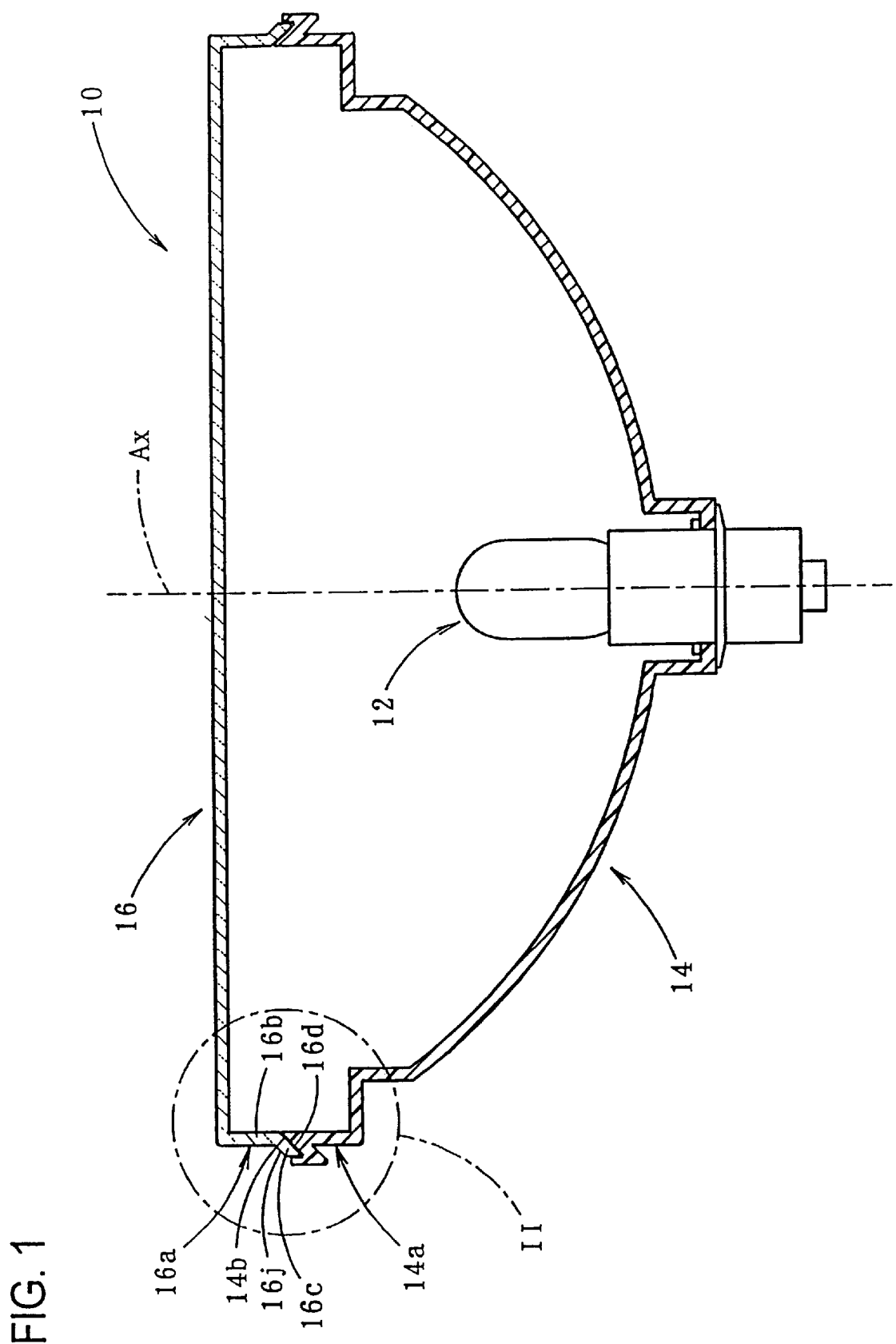
FIG. 1 is a sectional side elevation of a vehicular lamp unit according to the first embodiment of the present invention, which is placed on its top facing upward.
Figure 2:
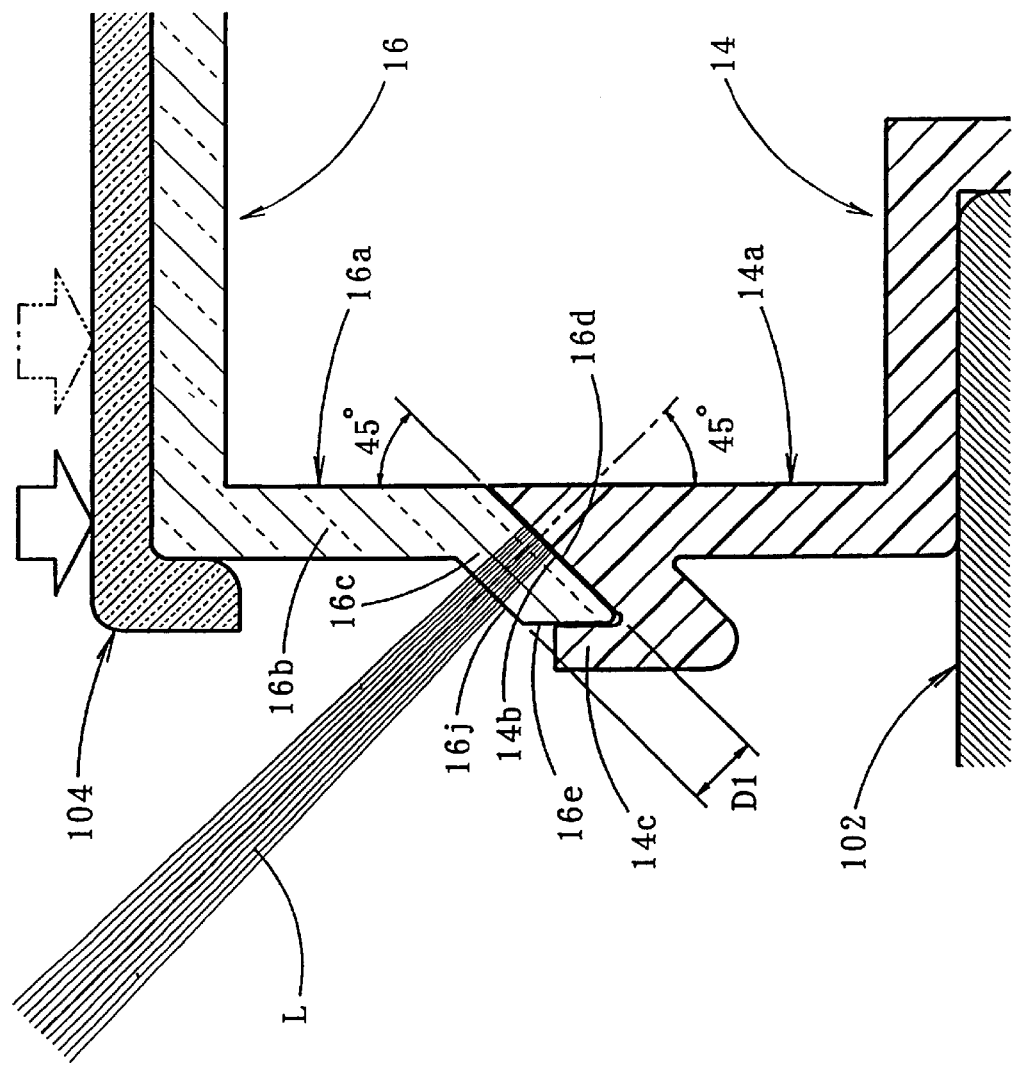
FIG. 2 is a view showing a portion II shown in FIG. 1 in detail.

FIG. 1 is a sectional side elevation representing a vehicular lamp unit of the first embodiment which is mounted with its top directed upward. FIG. 2 is a view showing in detail a portion II indicated in FIG. 1.

As shown in these drawings, a vehicular lamp unit 10 is embodied as an indicator lamp such as a tail lamp. The lamp unit 10 includes a lamp body 14, on a lamp reference axis Ax of which is mounted a light source bulb 12 extending vertically in the drawing (in the longitudinal direction with respect to the lamp unit when mounted on a vehicle), and a front lens 16 directly bonded to the lamp body 14.

The front lens 16 is formed of a transparent thermoplastic resin material such as Polymethyl-methacrylate ("PMMA") or Poly-carbonate ("PC"). The outer peripheral edge portion of the front lens 16 is provided with a seal leg 16a that extends downward over the entire length. The main portion 16b of the seal leg 16a extends vertically, and an end portion 16c extends diagonally downward so as to be bent toward the outer periphery at 45° relative to the reference axis of the lamp (i.e., in the vertical direction in the drawing). Therefore, the end surface (lower end surface) 16d of the seal leg 16a and the upper inclined surface 16j of the end portion 16c are formed as flat surfaces that are inclined at 45° with respect to the vertical axis. The upper inclined surface 16j is formed as a laser beam receiving surface. The outer side surface 16e of the end portion 16c is formed to constitute the vertical surface.

The lamp body 14 is formed of an opaque thermoplastic resin material such as Acrylonitrile-styrene-acrylate ("ASA") or Acrylonitrile-butadiene-styrene ("ABS"). It is provided with an edge flange portion 14a that extends vertically at its front end opening. Similar to the end surface 16d of the seal leg 16a, an end surface (upper end surface) 14b of the edge flange portion 14a is formed as a flat surface inclined at 45° downward with respect to the reference axis. The end surface 14b constitutes the receiving surface against which the end surface 16d of the seal leg 16a abuts. The receiving surface 14b is provided with an outer rib 14c that projects vertically along the outer side surface 16e of the end portion 16c of the seal leg 16a.

The front lens 16 is bonded to the lamp body 14 by laser beam welding the end surface 16d of the seal leg 16a to the receiving surface 14b.

Figure 3:
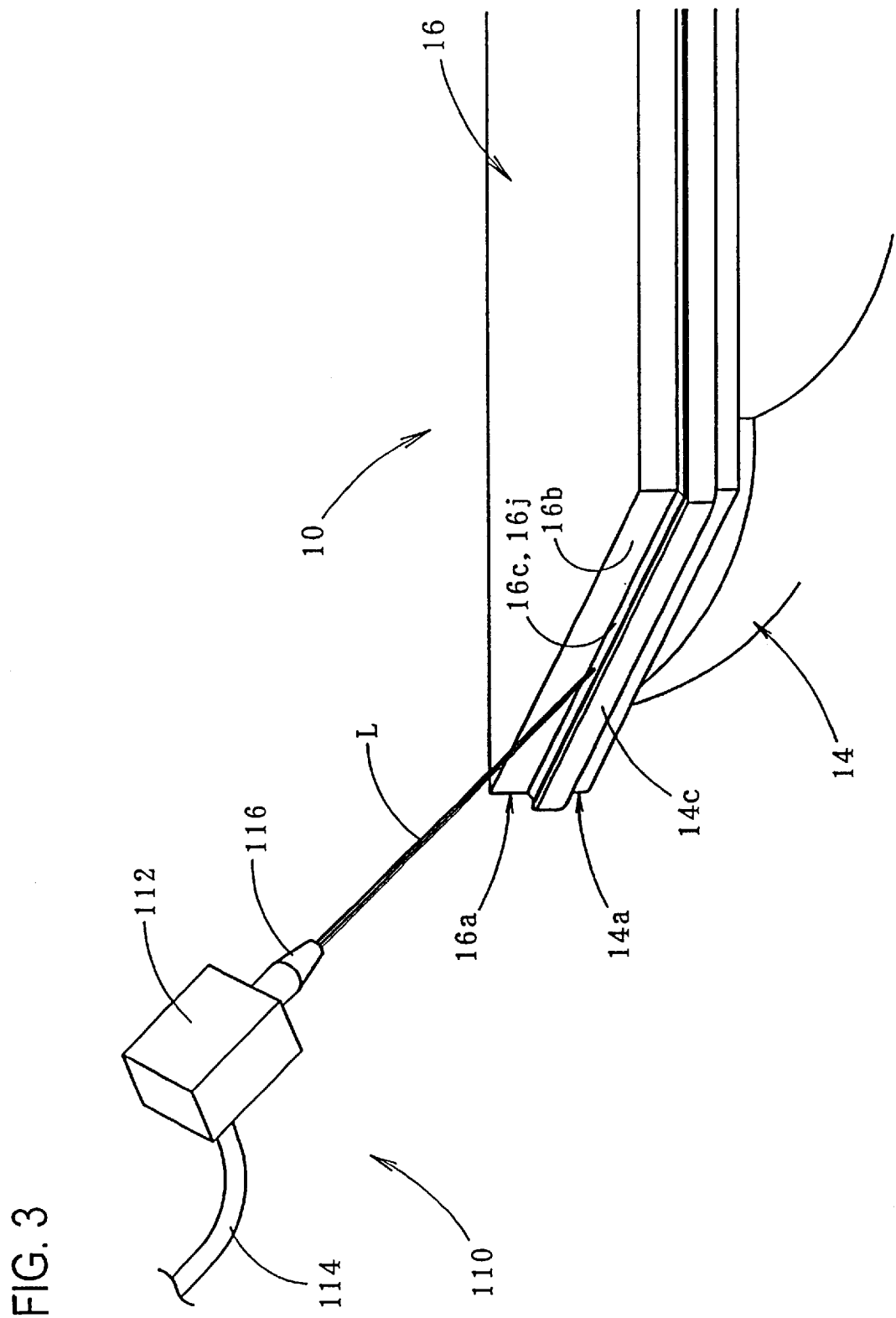
FIG. 3 is a perspective view showing the vehicular lamp unit and a welding robot used for performing laser beam welding in the embodiment.

FIG. 3 is a perspective view showing the vehicular lamp unit 10 and a welding robot 110 used for laser beam welding. Referring to the drawing, laser beam welding is performed by the. welding robot 110 with the vehicular lamp unit 10 placed with its top directed upward.

The welding robot 110 is formed of a robot body (not shown) to which a laser head 112 is attached. This laser head 112 is provided with a fiber cable 114 containing an optical fiber and an emission nozzle 116 with a built-in capacitor lens. The laser beam generated by a laser oscillator (not shown) is emitted from the emission nozzle 116 as a convergent light beam through the fiber cable 114. The laser beam emitted from the emission nozzle 116 serves to form a beam spot of about a diameter of about 1.5 mm at a focal distance of about 60 mm. The laser oscillator is formed of a semiconductor laser with an output of 15 to 100 W and a wavelength of 0.8 to 1.5 μm.

The laser beam welding is performed in the following way.

As shown in FIG. 2, the lamp body 14 is placed on a receiving jig 102, and the front lens 16 is set onto the lamp body 14 in such a manner that the end surface 16d of the seal leg 16a is brought into abutment against the receiving surface 14b. The front lens 16 is further covered with a transparent pressure plate 104 so as to press the front lens 2 downward to the lamp body 4 via the transparent pressure plate 104 by applying pressure to the base portion of the seal leg 16a.

The laser head 112 is positioned diagonally upward of the seal leg 16a of the front lens 16 so as to emit the laser beam L from the emission nozzle 116 at 45° in the diagonally downward direction. The laser beam L is irradiated to the laser beam receiving surface 16j of the end portion 16c of the seal leg 16a so as to permeate through the end portion 16c and irradiate to the receiving surface 14b of the lamp body 14. The receiving surface 14b is heated and melted by the irradiation energy of the laser beam L. The resultant heat also melts the end surface 16d of the seal leg 16a. The laser beam L is scanned over the entire length of the front lens 16 along the seal leg 16a while keeping the incident angle of the laser beam L relative to the end portion 16c of the seal leg 16a constant so as to bond the front lens 16 and the lamp body 14 together.

As has been described in detail, in the vehicular lamp unit 10 of the first embodiment, the front lens 16 and the lamp body 14 are directly bonded together by laser beam welding applied between bonded surfaces, that is, the end surface 16d of the seal leg 16a of the front lens 16 and the receiving surface 14b of the lamp body 14. This makes it possible to perform strong bonding while generating substantially no burrs on the two bonded surfaces. The outer appearance of the portion around the bonded surfaces is thus improved.

In the vehicular lamp unit 10 according to the first embodiment, the end surface 16d of the seal leg 16a is formed at the end portion 16c that is bent toward the outer periphery at a predetermined angle. This makes it possible to irradiate the laser beam L onto the receiving surface 14b of the lamp body 14 by directing the beam through the end portion 16c of the seal leg 16a from the direction orthogonal to the end surface 16d of the seal leg 16a. The resultant effects will be described below.

The permeation distance of the laser beam L during bonding corresponds to the distance of D1 that represents the thickness of the end portion 16c of the seal leg 16a. The distance D1 is far shorter than the permeation distance of the laser beam in the case where it is directed to permeate through the transparent pressure plate 104 and the seal leg 16a (i.e, the distance obtained by adding the thickness of the transparent pressure plate 104 to the distance Do as the entire length of the seal leg 2a shown in FIG. 8). That is, D1<<Do.

If the laser beam is irradiated from the direction substantially orthogonal to the end surface 16d of the seal leg 16a, the front lens 16 can be pressed by applying a pressure to the base end portion of the seal leg 16a, as shown by a solid-line arrow mark in FIG. 2. (The dashed-line. arrow represents the position where the front lens 16 is pressed when the laser beam irradiation penetrates through the transparent pressure plate 104 and the seal leg 16a.) This makes it possible to bring the end surface 16d of the seal leg 16a into abutment against the receiving surface 14b across its width with a uniform pressure. Therefore, the required bonding strength can be easily ensured across the entire width of the bonded surface.

The vehicular lamp unit of the first embodiment having the front lens and the lamp body directly bonded together has an improved outer appearance quality of the portion around the bonded surfaces as well as a sufficiently enhanced bonding strength between the front lens and the lamp body.

As the bonded surfaces according to the first embodiment are inclined at a predetermined angle relative to the reference axis Ax of the lamp, the following advantageous effects can be obtained.

In the case where the end surface 16d of the seal leg 16a or the receiving surface 14b has a wave-like irregularity owing to insufficient smoothness such that gaps are created in areas therebetween, the pressure acting on the members to be bonded causes slippage between them because the bonded surface is inclined. The slippage serves to seal the gaps created in the areas between both members so as to enable abutment thereof over the entire length of the bonded surface. Accordingly, bonding failure is prevented.

In this embodiment, the receiving surface 14b of the lamp body may be provided with an outer rib 14c that projects in the outward direction along the outer side surface 16e of the end portion 16c of the seal leg 16a of the front lens 16 such that the outer rib 14c is, brought into abutment against the seal leg 16a. This makes it possible to prevent generation of unnecessary slippage between the end surface 16d of the seal leg 16a and the receiving surface owing to the pressure applied during the bonding operation.

Figure 4:
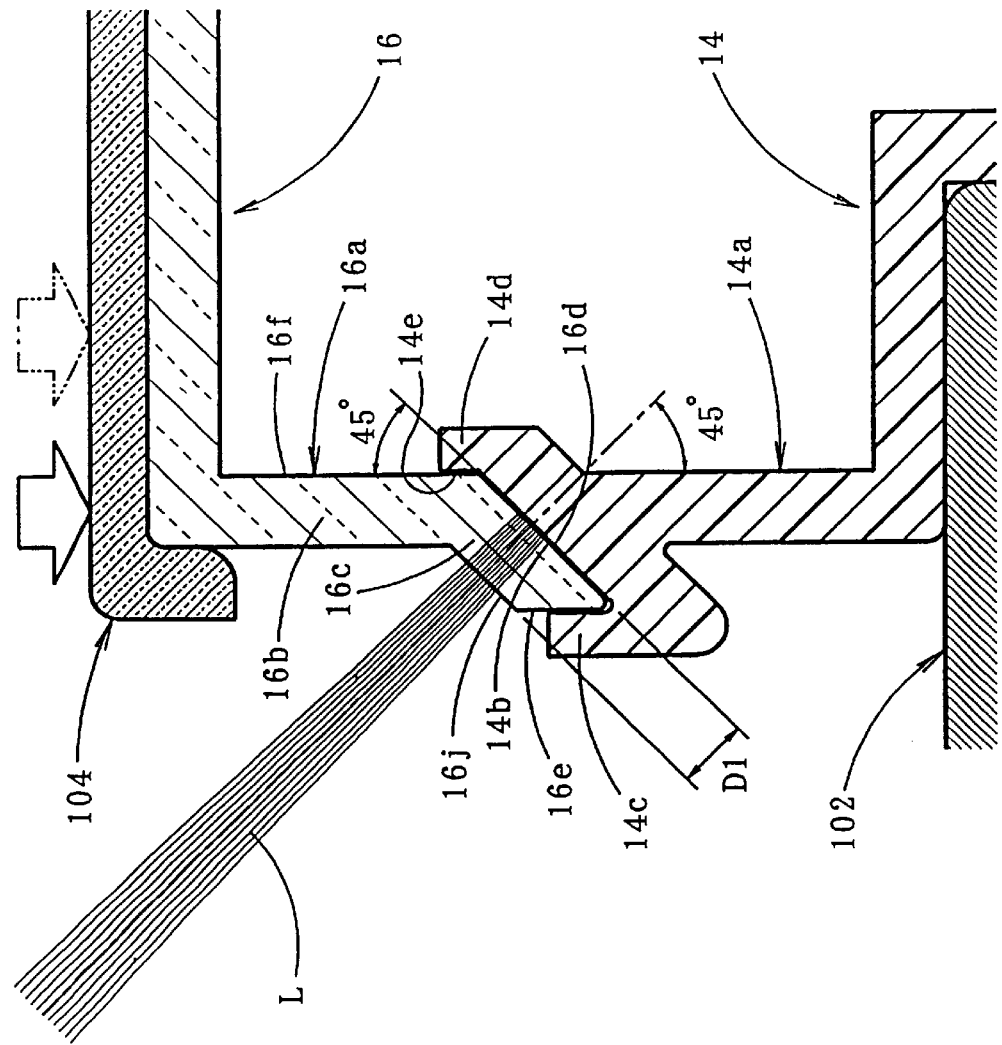
FIG. 4 is a view similar to FIG. 2 showing a first modified example of the embodiment of FIG. 1.

FIG. 4 is a view similar to FIG. 2 and representing a first modified example of the first embodiment.

Referring to FIG. 4, the basic structure of the modified example is substantially the same as that of the aforementioned embodiment. In the modified example, however, an inner rib 14d that projects in the outward direction along the inner side surface 16f of the seal leg 16a of the front lens 16 is added to the receiving surface 14b of the lamp body 14.

The above-identified structure enables irradiation of the laser beam from the direction substantially orthogonal to the end surface 16d of the seal leg 16a onto the outer side surface 14e of the inner rib 14d so as to heat and melt the inner rib 14d irrespective of the irradiation direction displacement. Therefore, the outer side surface 14e of the inner rib 14d and the inner side surface 16f of the seal leg 16a can be formed as second bonded surfaces. This makes it possible to further enhance the bonding strength between the front lens 16 and the lamp body 14.

Figure 5:
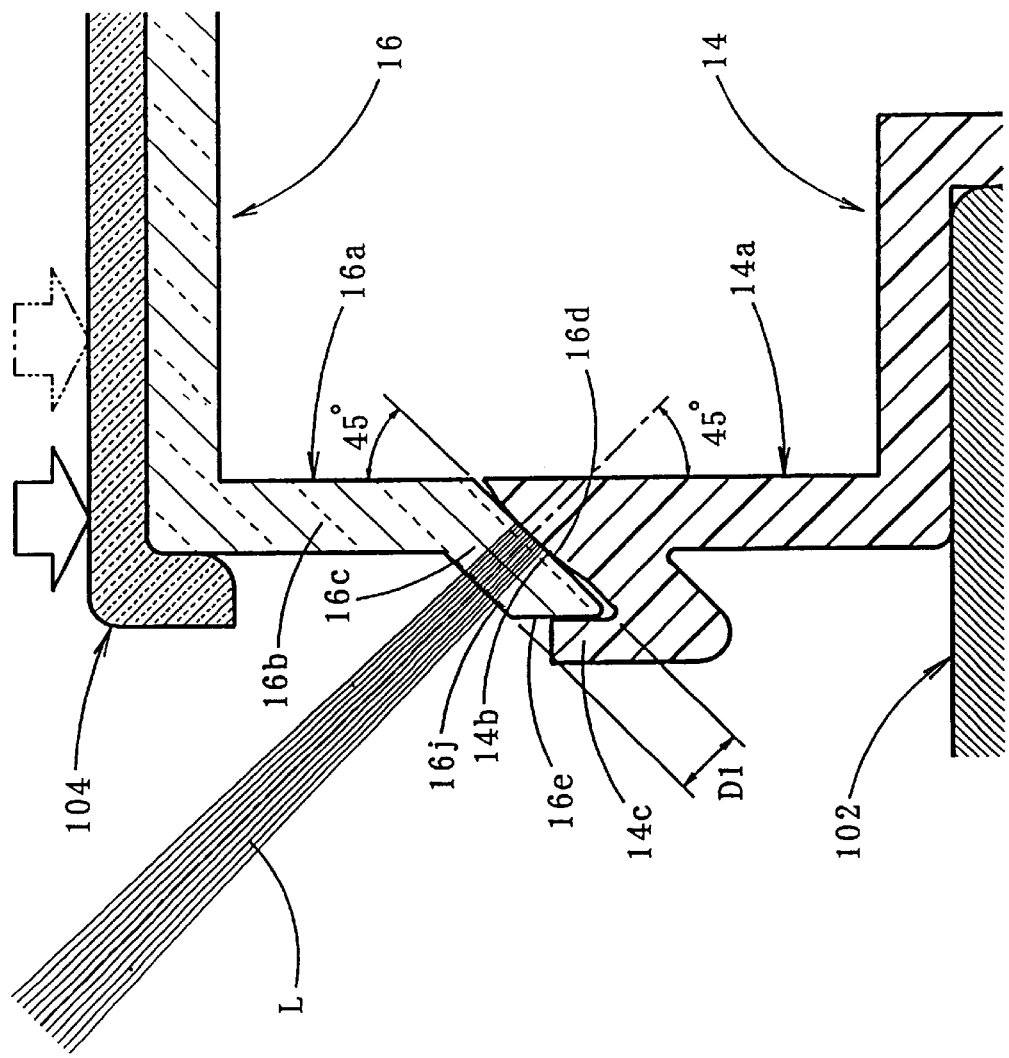
FIG. 5 is a view similar to FIG. 2 showing a second modified example of the embodiment of FIG. 1.

FIG. 5 is the view similar to FIG. 2 representing a second modified example of the first embodiment.

Referring to the drawing, the basic structure of the second modified example is substantially identical to that of the aforementioned embodiment. In the second modified example, however, an approach having an convex arc-like section is formed on the receiving surface 14b of the lamp body 14.

That is, the receiving surface 14b is formed in a convexly curved shape such that the irradiation energy of the laser beam L can be converged by setting the contact portion between the end surface 16d of the seal leg 16a and the receiving surface 14b to a smaller value at an earlier stage of the bonding operation. The contact portion is gradually expanded as the heating and melting of the receiving surface 14b proceeds. Therefore, the work efficiency of the bonding process is improved. The bonded surface is formed into an inclined surface like the aforementioned embodiment when the laser beam welding is completed.

The approach R may be formed on the end surface 16d of the seal leg 16a instead of on the receiving surface 14b. This provides the same effects as those of the modified example.

Figure 6:
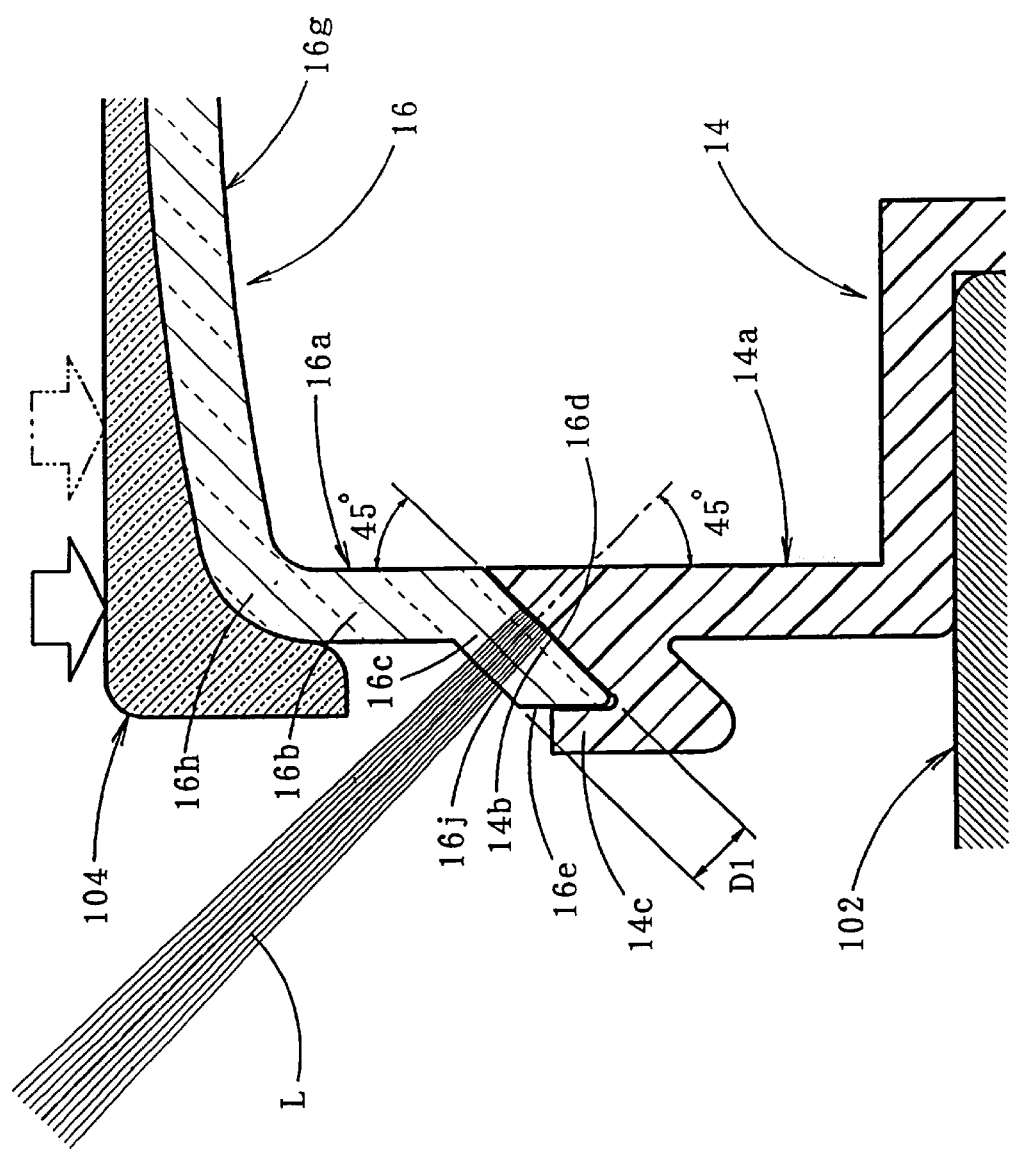
FIG. 6 is a view similar to FIG. 2 showing a third modified example of the embodiment of FIG. 1.

FIG. 6 is the view similar to FIG. 2 representing a third modified example of the first embodiment.

As shown in the drawing, the portion around the bonded surfaces between the front lens 16 and the lamp body 14 of the modified example is the same as that of the aforementioned example. In the third modified example, however, the lens body 16g of the front lens 16 is formed in a curved shape, and a base end portion 16h of the seal leg 16a is provided with a relatively larger corner.

Figure 8:
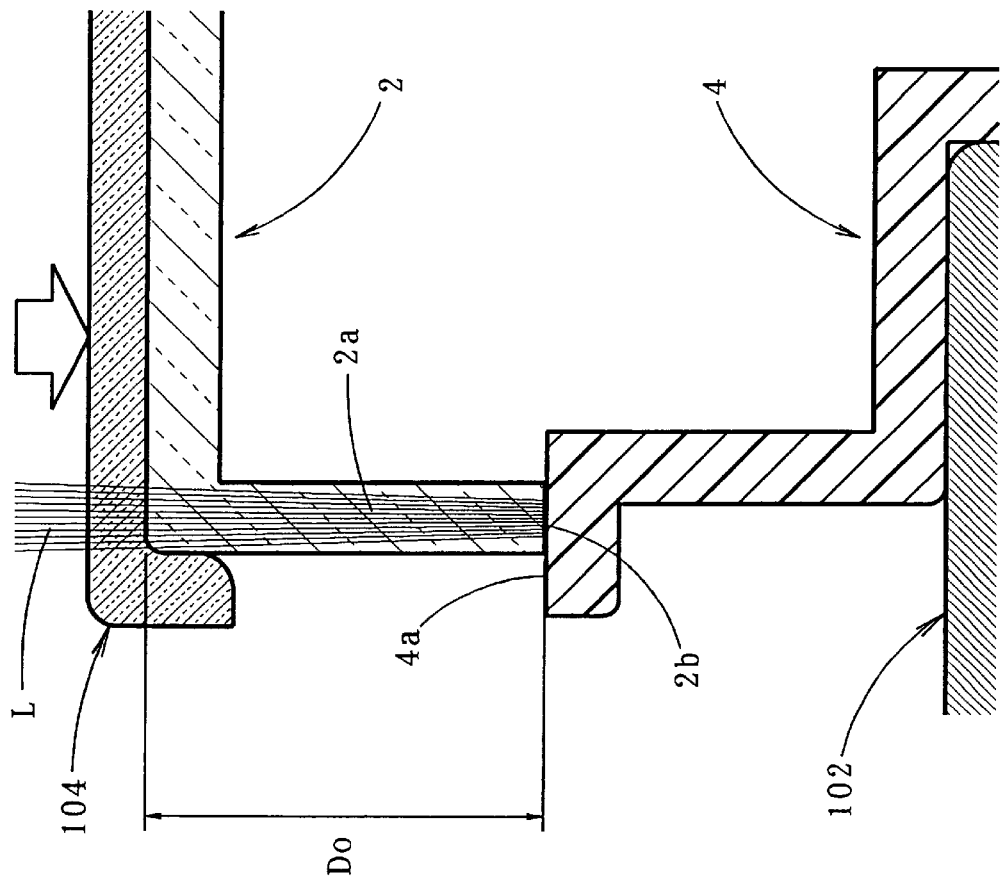
FIG. 8 is a view similar to FIG. 2 illustrating a conventionally employed bonding method in the case where a front lens and a lamp body are bonded by laser beam welding.

In the case where the laser beam is emitted to the base end portion 16h of the seal leg 16a of the aforementioned front lens 16 for irradiation onto the receiving surface 14b through the seal leg 16a using the laser beam welding method shown in FIG. 8, the optical path of the laser beam in the transparent pressure plate 104 and the front lens 16 becomes complicated and difficult to establish and control. Accordingly this method is generally impractical because it is difficult to control the laser beam so that it reaches the receiving surface 14b accurately. In this modified example, the laser beam L is emitted to the end portion 16c of the seal leg 16a from diagonally upward thereof. This method enables the laser beam to accurately reach the receiving surface 14b without limiting the design of the front lens 16.

In this modified example, the laser beam is not required to permeate through the transparent pressure plate 104. Therefore, the plate may be replaced with another type of pressure plate formed of an opaque material. This applies to the other embodiments and modified examples.

A second embodiment of the present invention will be hereinafter described.

Figure 7:
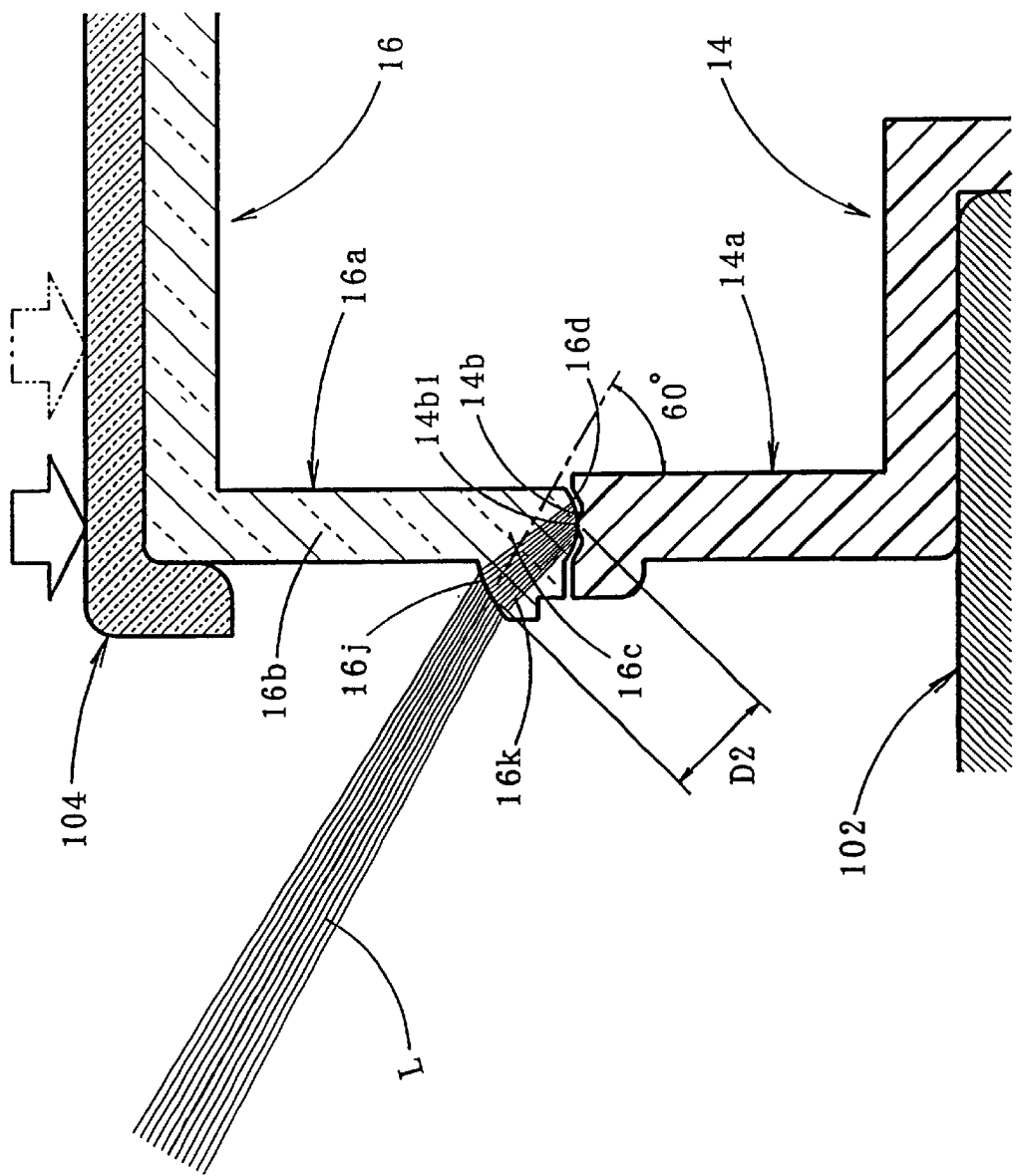
FIG. 7 is a view similar to FIG. 2 showing essential portions of a vehicular lamp unit constructed according to a second embodiment of the invention.

FIG. 7 is a view similar to FIG. 2 representing essential portions of the vehicular lamp unit of this embodiment.

In the second embodiment, the basic structure is the same as that of the first embodiment, except for the structure of the portion around the bonded surfaces between the front lens 16 and the lamp body 14.

In this embodiment, the bonded surfaces of the front lens 16 and the lamp body 14 are set to be substantially orthogonal with respect to the vertical direction in the drawing (the direction of the pressure applied during bonding). The end surface 16d of the seal leg 16a is formed as a convex surface having an arc-like section. On the other hand, the receiving surface 14b of the lamp body 14 is formed as a wave-like concave surface corresponding to the aforementioned convex surface. The center portion of the wave-like concave surface is provided with a small protrusion 14b1 that abuts against the convex surface.

In this embodiment, a flange portion 16k projecting to the outer periphery is formed on the end portion 16c of the seal leg 16a along the entire length thereof. The upper surface of the flange portion 16k constitutes a laser beam receiving surface 16j. The laser beam receiving surface 16j is formed as a convex surface having an arc-like section so as to receive a laser beam L irradiated an incident direction inclined at approximately 60° with respect to the reference axis (vertical axis in the drawing). The laser beam L incident on the laser beam receiving surface 16j is converged and then refracted downward. The laser beam L is thus conducted to the end surface 16d of the seal leg 16a.

The laser beam L that has been conducted to the end surface 16d is irradiated onto the small protrusion 14b1 of the receiving surface 14b in contact with the end surface 16d. The small protrusion 14b1 is heated and melted so that the contact area is gradually expanded as the melting proceeds until the end surface 16d is finally welded to the receiving surface 14b over the entire convex surface.

In this embodiment, the permeation distance of the laser beam L during bonding between the front lens 16 and the lamp body 14 corresponds to the distance D2 from the laser receiving surface 16j and the end surface 16d of the seal leg 16a. This distance is far shorter than the permeation distance in the case where irradiation of the laser beam L is performed through the transparent pressure plate 104 and the seal leg 16a (i.e., the distance obtained by adding the thickness of the transparent pressure plate 104 to the distance Do as the entire length of the seal leg 2a shown in FIG. 8). That is, D2<<Do.

As the laser beam L is irradiated from the direction inclined with respect to the bonded surface, the front lens 16 can be pressed by applying pressure to the base end portion of the seal leg 16a, as indicated by a solid-line arrow mark in FIG. 7. (The dashed-line arrow mark represents the position where the front lens 16 is pressed when the laser beam irradiation penetrates through the transparent pressure plate 104 and the seal leg 16a.) This makes it possible to bring the end surface 16d of the seal leg 16a into abutment against the receiving surface 14b across the width of the latter with a uniform pressure. Therefore, the required bonding strength is easily ensured across the entire width of the bonded surface.

In the vehicular lamp unit according to the embodiment having the front lens and the lamp body directly bonded together, the bonding strength between the front lens and the lamp body is enhanced while improving the outer appearance quality around the bonded surface.

In this embodiment, the bonded surface is substantially orthogonal to the vertical axis. This makes it possible to simplify the metal molds used for forming the front lens 16 and the lamp body 14. As the bonded surface is defined by the combination of the convex surface (the end surface 16d of the seal leg 16a) and the wave-like concave surface (receiving surface 14b of the lamp body 14), the following advantageous effects can be obtained.

In the case where gaps are created in areas between the end surface 16d of the seal leg 16a and the receiving surface 14b owing to insufficient surface smoothness of at least one of the aforementioned surfaces, the bonded surface is formed by combining the convex surface and wave-like concave surface, and the small protrusion 14b1 is heated and melted under a pressure in the vertical direction acting between the front lens 16 and the lamp body 14. As the heating and melting proceeds, the contact portion between the front lens 16 and the lamp body 14 is gradually expanded. Therefore, the gaps in areas between the end surface 16d of the seal leg 16a and the receiving surface 14b are easily sealed due to the high pressure applied to the other contact portion that is heated and melted at an earlier stage. Therefore, the end surface 16d of the seal leg 16a and the receiving surface 14b can be reliably brought into abutment along the entire length of the bonded surface, thus preventing bonding failure.

Preferred embodiments of the invention have been described in the case where the vehicular lamp unit 10 is formed as an indicator lamp. Similar effects to those of the aforementioned embodiments can be obtained by applying the structure of the aforementioned embodiments to other kinds of vehicular lamp units.

What is claimed is:

1. A vehicular lamp unit comprising:
   a front lens and a lamp body, said front lens comprising a seal leg formed on an outer periphery of said front lens, said lamp body comprising a seal leg receiving surface in abutment with an end surface of said seal leg, a laser beam receiving surface being formed on an outer side surface of said seal leg whereby a laser beam directed onto said laser beam receiving surface is passed through said seal leg and irradiated onto said seal leg receiving surface, said end surface of said seal leg and said seal leg receiving surface being bonded together by laser beam welding to form a bonded surface between said front lens and said lamp body, wherein said end surface is chamfered.

2. The vehicular lamp unit according to claim 1, wherein an end portion of said seal leg bends in an outward direction of said front lens.

3. The vehicular lamp unit according to claim 1, wherein said lamp body further comprises an outer rib projecting along an outer side surface of said seal leg.

4. The vehicular lamp unit according to claim 1, wherein said lamp body further comprises an inner rib projecting along an inner side surface of said seal leg.

5. The vehicular lamp unit according to claim 2, wherein said lamp body further comprises an inner rib projecting along an inner side surface of said seal leg.

6. The vehicular lamp unit according to claim 1, wherein at least a portion of said seal leg receiving surface is convexly curved.

7. A vehicular lamp unit comprising: a front lens and a lamp body, said front lens comprising a seal leg formed on an outer periphery of said front lens and extending in an outward direction of said front lens, said lamp body comprising a seal leg receiving surface in abutment with an end surface of said seal leg, said end surface of said seal leg and said seal leg receiving surface (1) being chamfered, and (2) bonded together by laser beam welding to form a bonded surface between said front lens and said lamp body, and a laser beam receiving surface, for receiving a laser beam and directing said laser beam onto said bonded surface, being formed on an outer side surface of said seal leg.

8. The vehicular lamp unit according to claim 7, wherein said seal leg receiving surface and said end surface are chamfered at respective angles of inclination that are substantially equal to one another.

9. The vehicular lamp unit according to claim 8, wherein said seal leg receiving surface and said end surface are chamfered at respective angles of inclination that are substantially equal to 45°.

10. The vehicular lamp unit according to claim 7, wherein said lamp body further comprises an outer rib projecting along an outer side surface of said seal leg.

11. The vehicular lamp unit according to claim 7, wherein said lamp body further comprises an inner rib projecting along an inner side surface of said seal leg.

12. The vehicular lamp unit according to claim 8, wherein, said lamp body further comprises an inner rib projecting along an inner side surface of said seal leg.

13. The vehicular lamp unit according to claim 7, wherein at least a portion of said seal leg receiving surface is convexly curved.

14. A vehicular lamp unit comprising: a front lens and a lamp body, said front lens comprising a seal leg formed on an outer periphery of said front lens and extending in an outward direction of said front lens, and said lamp body comprising a seal leg receiving surface in abutment with an end surface of said seal leg, said end surface of said seal leg being formed as a convex surface, said seal leg receiving surface being formed as a wave-like concave surface, said seal leg having an outwardly projecting flange portion with a convex surface such that a laser beam introduced onto said convex surface of said flange portion is directed through said seal leg onto said seal leg receiving surface, said end surface of said seal leg and said seal leg receiving surface of said lens body being bonded together by laser beam welding to form a bonded surface between said front lens and said lamp body.

15. The vehicular lamp unit according to claim 14, wherein said convex surface of said flange portion is inclined with respect to a main portion of said seal leg.

16. A process for producing a vehicular lamp unit comprising the steps of:

providing a front lens having a seal leg that extends around said front lens on an outer periphery of said front lens and projects from said front lens in an outward direction, said seal leg having a laser beam receiving surface;

providing a lamp body having a seal leg receiving surface that protrudes from said lamp body at a position corresponding to an end surface of said seal leg;

abutting said end surface of said seal leg against said seal leg receiving surface; and directing a laser beam onto said laser beam receiving surface to pass said laser beam through said seal leg to heat and melt a portion of said seal leg receiving surface while pressing said front lens toward said lamp body, thereby bonding said front lens and said lamp body.

17. The process for producing a vehicular lamp unit according to claim 16, wherein an end portion of said seal leg bends toward said outer periphery of said front lens at an acute angle with respect to a main portion of said seal leg.

18. The process for producing a vehicular lamp unit according to claim 16, wherein said lamp body further comprises an outer rib projecting along an outer side surface of said seal leg.

19. The process for producing a vehicular lamp unit according to claim 16, wherein said lamp body further comprises an inner rib projecting along an inner side surface of said seal leg.

20. The process for producing a vehicular lamp unit according to claim 17, wherein said lamp body further comprises an inner rib projecting along an inner side surface of said seal leg.

21. The process for producing a vehicular lamp unit according to claim 16, wherein at least a portion of said laser beam receiving surface is convexly curved.

22. A process for producing a vehicular lamp unit comprising the steps of:

providing a front lens having a seal leg that extends around said front lens on an outer periphery of said front lens and projecting from said front lens in an outward direction, said seal leg having an end portion bending toward said outer periphery at a predetermined angle, said seal leg having a laser beam receiving surface;

providing a lamp body having a seal leg receiving surface that protrudes from said lamp body at a position corresponding to an end surface of said seal leg, said seal leg receiving surface being inclined at substantially said predetermined angle;

abutting said end surface of said seal leg against said seal leg receiving surface; and directing a laser beam onto said laser beam receiving surface through said seal leg substantially orthogonal to said end surface to heat and melt a portion of said seal leg receiving surface while pressing said front lens toward said lamp body, thereby bonding said front lens and said lamp body.

\* \* \* \* \*